United States Patent [19]

Togawa et al.

[11] Patent Number: 5,350,618
[45] Date of Patent: Sep. 27, 1994

[54] MAGNETIC MEDIUM COMPRISING A SUBSTRATE HAVING PITS AND GROOVES OF SPECIFIC SHAPES AND DEPTHS

[75] Inventors: Masayuki Togawa; Kiyoshi Toyama, both of Gifu, Japan

[73] Assignee: Teijin Seiki Co., Ltd., Osaka, Japan

[21] Appl. No.: 842,057

[22] Filed: Feb. 26, 1992

[30] Foreign Application Priority Data

Mar. 1, 1991 [JP] Japan .................. 3-034935
May 1, 1991 [JP] Japan .................. 3-099354
May 1, 1991 [JP] Japan .................. 3-099355

[51] Int. Cl.$^5$ .................................. B32B 3/00
[52] U.S. Cl. ........................ 428/156; 360/131; 360/135; 369/109; 369/277; 428/167; 428/168; 428/694 BR; 428/694 TR; 428/900
[58] Field of Search .......... 428/694, 900, 694 SG, 428/694 TR, 694 BR, 156, 167, 168; 360/131, 135; 369/275.1, 275.2, 275.3, 275.4, 109, 277

[56] References Cited

U.S. PATENT DOCUMENTS

| | | | |
|---|---|---|---|
| 2,501,126 | 10/1946 | Howell | 360/134 X |
| 3,099,571 | 7/1963 | Maierson et al. | 117/36.1 |
| 3,554,798 | 1/1971 | Nacci | 360/131 X |
| 4,351,010 | 9/1982 | Arai | 360/131 |
| 4,480,302 | 10/1984 | Kalk et al. | 346/135.1 |
| 4,517,616 | 5/1985 | Bischoff | 360/126 |
| 4,556,967 | 12/1985 | Braat | 369/275 |
| 4,562,105 | 12/1985 | Machida et al. | 428/161 |
| 4,716,560 | 12/1987 | Itonaga | 369/275 |
| 4,844,963 | 7/1989 | Takasuna et al. | 428/64 |
| 4,875,987 | 10/1989 | Wada et al. | 204/192.15 |
| 4,911,967 | 3/1990 | Lazzari | 428/64 |
| 4,935,278 | 6/1990 | Krounbi et al. | 428/64 |
| 5,060,223 | 10/1991 | Segawa | 369/275.4 |
| 5,114,552 | 9/1992 | Abe | 369/275.4 |

FOREIGN PATENT DOCUMENTS 0120990 of 1987 European Pat. Off. ..... H01F 41/14
8809979 of 1988 United Kingdom ......... G08B 13/24

OTHER PUBLICATIONS

Patent Abstracts of Japan vol. 10, No. 279 (E-439)(2335) 20 Sep. 1986 & JP-61 100 910 (H. Yamada) 19 May 1986 -Abstract.
Patent Abstracts of Japan, vol. 10, No. 217 (E-423)(2273) 29 Jul. 1986 & JP-61 54 857 (Nippon Radiator Co.) 19 Mar. 1986 -Abstract.
Extended Abstracts, vol. 82, No. 2, Oct. 1982, Princeton, N.J., pp. 291-292, W. Van Den Hoek et al.

*Primary Examiner*—Paul J. Thibodeau
*Assistant Examiner*—Lê H. Thi
*Attorney, Agent, or Firm*—Lane, Aitken & McCann

[57] ABSTRACT

A magnetic medium comprising a substrate formed with a stepped pit and a magnetic substance buried in the stepped pit. A method of manufacturing a magnetic medium comprising the steps of forming a first groove in a substrate by photoetching, forming a second groove in the first groove or in a portion adjacent to the first groove by the photoetching, the second groove being different in depth from the first groove, and burying magnetic substances into the first and second grooves.

8 Claims, 21 Drawing Sheets

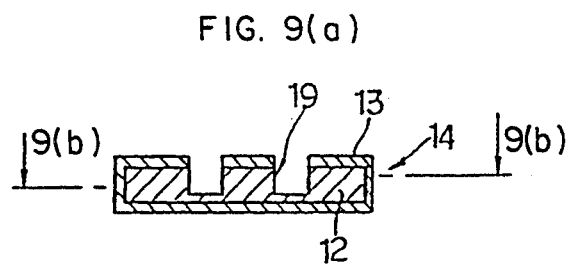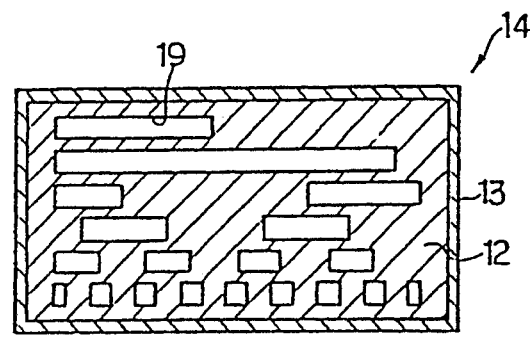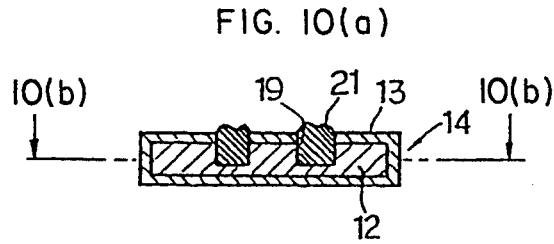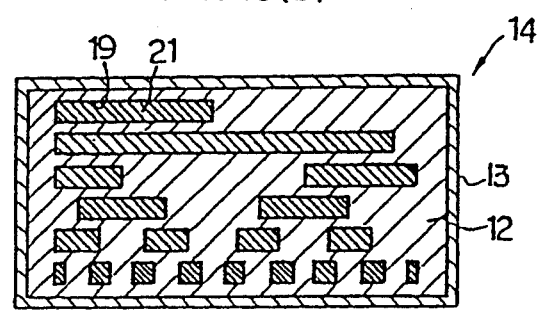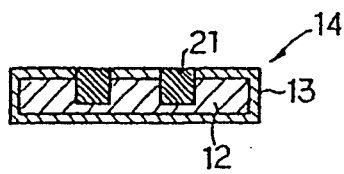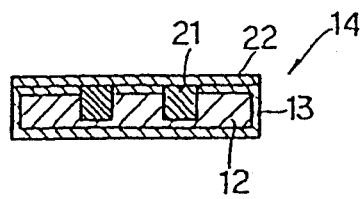

MAGNETIC MEDIUM COMPRISING A SUBSTRATE HAVING PITS AND GROOVES OF SPECIFIC SHAPES AND DEPTHS

FIELD OF THE INVENTION

The present invention relates to a magnetic medium that is used as magnetic patters of a magnetic scale and a DC motor, and a method of manufacturing a magnetic medium.

DESCRIPTION OF THE PRIOR ART

Generally, a magnetic head made of an electromagnet and a magnetic substance made of minute magnets are used in a magnetic recording and regenerating apparatus. In the case of the magnetic recording, the magnetic head generates a magnetic field that varies in accordance with record information, and the remanent magnetism of the magnetic substance moving through the magnetic field varied by that record information is caused to change in position. The record information is then recorded on the magnetic substance on basis of the positional change of the remanent magnetism. On the other hand, the magnetic head detects the positional change of the remanent magnetism of the magnetic substance as a voltage change.

The principles of the magnetic recording and regeneration as above mentioned have also been utilized in a magnetic sensor. That is, in the magnetic sensor, predetermined magnetic patterns are manufactured accurately by the magnetic head for recording, and the magnetic patterns are detected by the magnetic head for detection in order to acquire information on a position.

As an example of a conventional method of manufacturing magnetic patterns, a method of manufacturing linear-type magnetic patterns will hereinafter be described. First of all, a magnetic pattern manufacturing apparatus 1 is prepared as shown in FIG. 63. The magnetic pattern manufacturing apparatus 1 comprises a position detector 2, interconnecting members 3 and 4, an actuator 5, a magnetic head 6 and an I/V (current-/voltage) converting circuit 7. A magnetic medium 8 is connected to the position detector 2 and the actuator 5 through the interconnecting members 3 and 4. The actuator 5 causes the magnetic medium 8 to move accurately in the opposite directions indicated by the arrows A and B in FIG. 63, and the position of the magnetic medium 8 is detected by the position detector 2.

If the medium 8 is moved and fixed to a predetermined position by the actuator 5, then it contacts with the head ends 6a and the medium 8. An electric current is then applied to the coil of the magnetic head 6 by the I/V converting circuit 7 so that a magnetic field is generated. As a consequence, the magnetic medium 8 in the neighborhood of the magnetic head ends 6a and 6a is partly magnetized.

Subsequently, the magnetic medium 8 is moved to another predetermined position by the actuator 5. More, specifically, the position of the magnetic medium 8 during movement is always detected by the position detector 2, so that the magnetic medium 8 is moved and fixed to a desired position by the actuator 5 on the basis of the result of detection of the position detector 2. The magnetic medium 8 is then partly magnetized by the magnetic head 6 in the manner as above mentioned. If all of the predetermined portions of the magnetic medium 8 are magnetized in the same manner, the magnetic medium 8 having predetermined magnetic patterns, namely, a magnetic scale will be manufactured.

In the conventional method of manufacturing the magnetic scale, however, there are the drawbacks that it is difficult to improve the resolution (resolving power) of the magnetic scale, the manufacturing time becomes long, and the signal-to-noise (S/N) ratio of a detection signal at the time of position detection is decreased, for the following-reasons.

That is to say, the resolution of the magnetic scale depends upon the accuracy of magnetization, so a manufacturing apparatus requires a large equipment investment. It is therefore difficult to improve the resolution of the magnetic scale.

In addition, the magnetizing operation is required many times to form magnetic patterns on the magnetic medium 8, so that it takes a long period of time to manufacture the magnetic scale.

Furthermore, since the leakage magnetic flux of the magnetic head 6 is used when the magnetic medium 8 is magnetized, a powerful magnetic field cannot be applied to the magnetic medium 8. As a consequence, if the magnetic medium 8 is used to detect a position, the S/N ratio of the position signal becomes smaller.

It is, accordingly, an object of the present invention to a magnetic substance and a method for manufacturing the magnetic substance in which the S/N ratio of a detection signal at the time of magnetism detection is large, a resolution in the detection of magnetism is improved and the time needed for manufacturing is shortened.

SUMMARY OF THE INVENTION

The foregoing object is accomplished in accordance with the present invention by providing a magnetic medium comprising a substrate formed with a stepped pit, and a magnetic substance filling the stepped pit.

In the magnetic medium described above, a magnetic substance can be magnetized by strong magnetic field, since the magnetic substance is filling the pit formed in the substrate. In addition, an accuracy in a resolution does not depend upon an accuracy of magnetization and is determined by a positional accuracy of the pit.

The foregoing object is also accomplished in accordance with the present invention by providing a magnetic medium comprising a substrate formed with a pit, the pit, comprising a plurality of grooves adjacent to one another, at least one of the grooves being different in depth from the remaining grooves, and magnetic substances filling the grooves of the pit.

In addition to the advantages described above, since at least one of the grooves is different in depth from the remaining grooves, time magnetic substances can be varied in thickness in proportion to the depths of the grooves. Therefore, if the magnetic substances are magnetized by changing the number of the grooves and the depths of the grooves, an arbitrary magnetic filed intensity distribution can be obtained.

The foregoing object is also accomplished in accordance with the present invention by providing a magnetic medium comprising a substrate with a plurality of stepped pits disposed according to predetermined patterns, the depth of the pit being increased gradually toward the central portion of the pit, and magnetic substances filling the stepped pits.

When the magnetic substances are magnetized, the magnetic field intensity thereof becomes uniform, because the depth of the pit is increased gradually toward the central portion of the pit.

The foregoing object is also accomplished in accordance with the present invention by providing a magnetic medium comprising a substrate with a pit disposed according to predetermined patters, the pit comprising at least three grooves adjacent to one another, the depths of the at least three grooves being increased gradually toward a center groove of the at least three grooves, and magnetic substances filling the at least three grooves of the pit.

When the magnetic substances are magnetized, the magnetic field intensity thereof becomes uniform, because the depths of the at least three grooves are increased gradually toward the center groove.

The foregoing object is also accomplished in accordance with the present invention by providing a method of manufacturing a magnetic medium comprising the steps of forming a first groove in a substrate by photoetching, forming a second groove in the first groove or in a portion adjacent to the first groove by the photoetching, the second groove being different in depth from the first groove, and filling magnetic substances into the first and second grooves.

This method makes it possible to manufacture the magnetic media described above, since the first groove is different in depth from the second groove.

The foregoing object is also accomplished in accordance with the present invention by providing a method of manufacturing a magnetic medium comprising the steps of implanting impurities in a substrate, forming a first groove in said substrate by etching a part of the implanted impurities, forming a second groove by etching only the doped impurities, the second groove being different in depth from the first groove, and filling magnetic substances into the first and second grooves.

In this method, after the impurities have been implanted in the substrate, the first and second grooves are formed and the magnetic substance is filling the grooves. Accordingly, a magnetic medium having a high accuracy can be manufactured with ease. In addition, various magnetic media of high accuracy can be manufactured by exchanging only mask patterns. Further, when magnetic substances are magnetized, they can be magnetized at, one time and a plurality of substrates can be processed at one time in each process. Also, the magnetic substances can be magnetized by strong magnetic field. The magnetic media described above can also be manufactured, since the first groove is different in depth from the second groove.

The foregoing object is also accomplished in accordance with the present invention by providing a method of manufacturing a magnetic pattern comprising the steps of coating a substrate selectively with a metal film by photoetching, forming predetermined patterns in the substrate by dry etching, filling magnetic substances into the predetermined patterns formed by the dry etching, and magnetizing the magnetic substances.

Since dry etching is used in the second process, straight-walled grooves can be obtained even in the case that a magnetic pattern is disposed independently of the crystal direction of a substrate material.

The foregoing object is also accomplished in accordance with the present invention by providing a method of manufacturing a magnetic pattern comprising the steps of coating a substrate selectively with a metal film by wet etching, forming a protective film on the substrate coated selectively with the metal film, removing the metal film from the substrate and then forming predetermined patterns in the substrate by wet etching, filling magnetic substances into the predetermined patterns formed by the wet etching, and magnetizing the magnetic substances.

Since the wet etching is used, an expensive apparatus for dry etching such as RIE is not needed.

BRIEF DESCRIPTION OF THE DRAWINGS

The features and advantages of the present invention will be more clearly understood from the following description taken in conjunction with the accompanying drawings in which:

FIG. 9 (a) is a vertical cross-sectional view of the oxidized silicon substrate after the anisotropic etching process;

FIG. 9 (b) is a horizontal cross-sectional view taken along a horizontal plane indicated by line X—X in FIG. 9 (a);

FIG. 10 (a) is a vertical cross-sectional view of the oxidized silicon substrate having magnetic substances filling the grooves thereof;

FIG. 10 (b) is a horizontal cross-sectional view taken along a horizontal plane indicated by line Y—Y in FIG. 10 (a);

FIG. 11 is a vertical cross-sectional view of the oxidized silicon substrate after a polishing operation;

FIG. 12 is a vertical cross-sectional view of the oxidized silicon substrate coated with a protecting film;

DESCRIPTION OF THE PREFERRED EMBODIMENTS

Referring to FIGS. 1 to 14, there is shown an embodiment of a method of manufacturing a magnetic medium (e.g., magnetic scale) in accordance with the present invention. A silicon (Si) substrate 11 is made of single-crystal (monocrystalline) Si or singlecrystal Si having impurities, such as nitrogen or boron, confused therein. The dust particles adhered to the Si substrate 11 are removed therefrom in the way similar to a cleaning method of a semiconductor device, so that the Si substrate 11 is cleaned. The Si substrate 11 reacts on acids or alkalis and, depending upon kinds of those, can be etched by a so-called anisotropic etching in which the direction of the reaction is selective by the crystal directions of the Si substrate.

Figure 1:
FIG. 1 is a vertical cross-sectional view of a silicon substrate.
Figure 2:
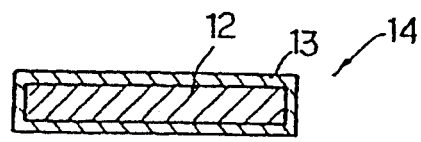
FIG. 2 is a vertical cross-sectional view of an oxidized silicon substrate formed by oxidizing the silicon substrate shown in FIG. 1.

Next, the cleaned surface portion of the Si substrate 11 is oxidized by an oxidizing process, and an oxidized Si substrate 14 consisting of a Si base 12 and a silicon dioxide ($SiO_2$) layer 13 is formed as shown in FIG. 2. More specifically, the surface portion of the Si substrate 11 is oxidized for 5 hours within a furnace (not shown) heated to 1000° C. The $SiO_2$ layer functions as a protective layer which prevents the unexposed portions of the oxidized Si substrate 14 from being etched by an anisotropic etching process to be described later. During the oxidizing process, oxygen gas that has passed through hot water of 80° C. is supplied into the furnace, since it is generally known that oxygen gas containing water vapor ($H_2O$) accelerates the speed of oxidization. In fact, time surface portion of the Si substrate 11 is oxidized by the oxygen in the water vapor.

A thin film forming process such as a chemical vapor deposition (CVD) process, a sputter deposition process or the like may be used in place of the oxidizing process as above mentioned. In addition, a layer made of metal such as titanium (Ti), chromium (Cr) or the like, a nitride made such as trisilicon tetranitride ($Si_3 N_4$) and time like, a carbide such as titanium carbide (TiC) and the like, an oxide such as aluminum hydroxide (Al-(OH)$_3$) or an organic substance may be used in place of the $SiO_2$ layer 13.

Figure 3:
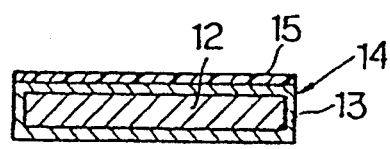
FIG. 3 is a vertical cross-sectional view of the oxidized silicon substrate coated with a photoresist.

As illustrated in FIG. 3, the surface of the oxidized Si substrate 14 is then coated with a photoresist 15 by a spin coating process and the like. More specifically, a few drops of photoresist compound made of organic resin are dropped onto the central portion of the oxidized Si substrate 14. Then, the oxidized Si substrate 14 is rotated about its own center axis perpendicular to its own surface, thereby uniformly and thinly extending the resist compound to form the photoresist 15 on the oxidized Si substrate 14. Furthermore, the oxidized Si substrate 14 coated with the photoresist 15 is putted into a constant temperature oven (not shown) heated to about 100° C. so that the photoresist 15 is stabilized. It is noted that AZ-1350J (positive type) or ONNR-20 (negative type), which is durable against plasma dry etching, may also be used as a resist compound.

Figure 4:
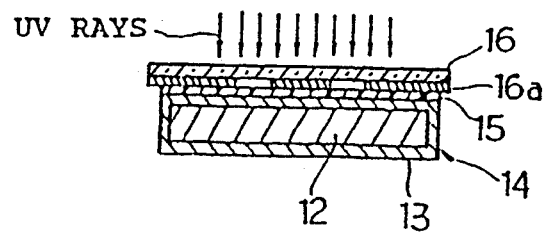
FIG. 4 is a vertical cross-sectional view of the oxidized silicon substrate coated with the photoresist during an exposing operation.

As shown in FIG. 4, a photomask 16 made from a glass plate having predetermined mask patterns is placed on the photoresist 15, and the photoresist 15 is then exposed to ultraviolet (UV) rays through the patterns of the photomask 16. The patterns of the photomask 16 are formed by a material 16a impermeable to UV rays. As a source of light, visible rays, electric beam, and X-rays are used. Generally, the photoresist can be classified as positive and negative, depending on how they respond to radiation. For positive resists, the exposed regions become more soluble. For negative resists, the exposed regions become less soluble. In this embodiment, the photoresist 15 comprises a positive resist.

Figure 5:
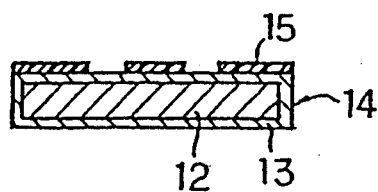
FIG. 5 is a vertical cross-sectional view of the oxidized silicon substrate partially coated with the photoresist after a developing operation.

The oxidized Si substrate 14 and the photoresist 15 are then immersed in a developer, so that the UV rays exposed portions of the photoresist 15 are dissolved and removed from the oxidized Si substrate 14, as shown in FIG. 5. The patterns formed in the photoresist 15 are the same as those on the photomask 16.

Figure 6:
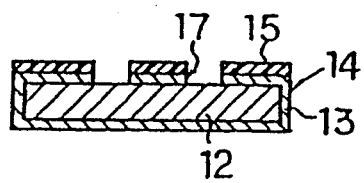
FIG. 6 is a vertical cross-sectional view of the oxidized silicon substrate coated with the photoresist after a reactive ion etching operation.

As shown in FIG. 6, the exposed portions of the $SiO_2$ layer 13 are etched by a reactive-ion etching (RIE) apparatus (not shown), so that windows 17 are formed in the $SiO_2$ layer 13. In instead off the RIE apparatus, an electron cyclotron resonance (ECR) etching apparatus or a reactive ion beam etching apparatus may also be used. More specifically, carbon tetrafluoride ($CF_4$) gas is supplied to a vacuum chamber in which the oxidized Si substrate 14 is placed, and is caused to be in the state of a plasma consisting of the carbon trifluoride ($CF_3$) and fluoride ($F^*$). At this time, the exposed portions of the $SiO_2$ layer 13 are vapored. F element of $CF_4$ is very reactive and combines with $SiO_2$. It is noted that, instead of the $CF_4$ gas, sulfur hexafluoride ($SF_6$) gas or gas consisting of $CF_4$ and $H_2$ can be used as etching gas.

Figure 7:
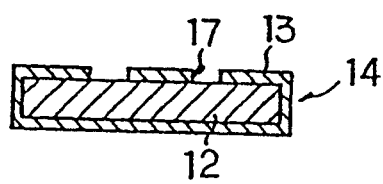
FIG. 7 is a vertical cross-sectional view of the oxidized silicon substrate after a photoresist removing operation.

Then, $O_2$ gas is supplied to the vacuum chamber for generating plasma, and the photoresist 15 is removed from the oxidized Si substrate 14, as shown in FIG. 7.

Figure 8:
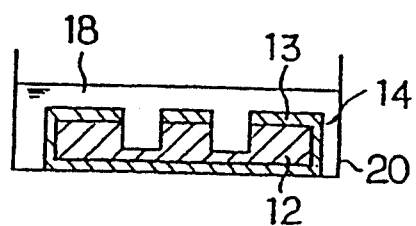
FIG. 8 is a vertical cross-sectional view of the oxidized silicon substrate during an anisotropic wet etching operation.

As illustrated in FIG. 8, the oxidized Si substrate 14 is then immersed in a potassium hydroxide (KOH) aqueous solution 18 and reacted until the Si base 12 is etched in a direction perpendicular to the surface of the Si oxidized substrate 14, so that grooves 19 having vertical side walls are formed as shown in FIGS. 9 (a) and 9 (b). The above mentioned etching process is defined as an anisotropic etching process. More specifically, KOH is weighed and putted into a beaker and mixed with pure water measured by a measuring cylinder. The KOH aqueous solution 18 is then supplied into a beaker 20 placed on a hot plate (not shown) of a stirrer (not shown), and then a stirring element is brought into the beaker 20. After the temperature of KOH aqueous solution 18 has been set to 80° C. and the number of rotations of the stirring element has been set to 600 rpm, the oxidized substrate 14 is immersed in the KOH aqueous solution 18. At the time that the exposed portions of the Si base 12 have been etched to a predetermined depth, the oxidized Si substrate 14 is taken out from the beaker 20 and washed by pure water, then the KOH aqueous solution 18 is completely removed from the oxidized Si substrate 14. The oxidized Si substrate 14 is heated and dried until the humidity of the oxidized Si substrate 14 is removed therefrom. Then, the conditions of the $SiO_2$ layer 13, the etched surface and the like are observed by an optical microscope. The etch rate for the monocrystalline Si is determined depending upon its crystal direction, for example, the etch rate for the <110>-orientation is 500 times as large as that for the <111>-orientation. If the surface of the Si substrate is assumed to be the (110)-plane, the etch rate in the thickness direction of the Si substrate is roughly 500 times as large as that in a direction perpendicular to the thickness direction. If the etch rate in the depth direction of the Si substrate is from 1 to 5 μm/minute, it will take 100 to 500 minutes to etch, for example, 500 μm in the substrate thickness direction. Note that, instead of an alkaline metal hydroxide such as KOH, an aqueous solution of an amine such as ethylenediamine, hydrazine or the like can also be used. Also, in FIG. 9 (a), the bottom portions of the grooves 19 are formed, but they may be completely removed by etching, in case of need.

The foregoing processes constitute a first step of forming the grooves 19 respectively corresponding to the predetermined patterns in the substrate 14 used for anisotropically etching by a photoetching process according to the present invention.

Then, magnetic substances 21 are buried in the grooves 19 of the oxidized Si substrate 14, respectively, as shown in FIGS. 10 (a) and 10 (b). As a method of burying the magnetic substances 21, there are the following four different methods.

In the first method, ferrite magnetic powder having a diameter of 1 to 5 μm is putted into the grooves 19. A different Si substrate is then laid on the top of the oxidized Si substrate 14 and pressed against the oxidized Si substrate 14, thereby increasing the density of the ferrite magnetic powder.

In the second method, the Si substrate 14 is set a vacuum film forming apparatus, and a sputter deposition process is performed by using a hard ferrite plate as a target. This process is similar to a usual sputtering process.

In the third method, application compound containing magnetic powder used for a magnetic tape or magnetic diskette, etc. is poured into the grooves 19 of the Si substrate 14. Then, the volatile material of the application compound is vaporized, thereby increasing the volume ratio of the magnetic powder. More specifically, the ferrite magnetic powder is sufficiently mixed with an organic liquid binder so as to uniformly scatter the magnetic powder in the binder liquid. However, it is necessary that air bubbles caused by entrained air are prevented from occurring during mixing. The intensity of a magnetic field is affected by the volume ratio of the magnetic powder, i.e., the magnetic field intensity varies in proportion to the volume ratio of magnetic powder. The liquid binder mixed with magnetic powder is dropped into the grooves 19 to the extent that it somewhat overflows the grooves 19. The Si substrate 14 is placed on a hot plate and heated to about 50° C., so that the volatile material of the liquid binder is vaporized. This results in a relative increase in the volume ratio of the magnetic powder.

In the fourth method, magnetic substances of metal are educed by an electroplating process in such a manner that the educed magnetic substances are filling grooves 19.

In all of the first to the fourth methods, the surfaces of the magnetic substances 4 are not smooth as shown in FIG. 10 (a). Therefore, the surfaces of the magnetic substances 4 are polished until they become smooth as shown in FIG. 11.

Then, a $SiO_2$ film having a thickness of 1.0 μm is formed on the oxidized Si substrate 14 by a chemical vapor deposition (CVD) process in order to form a protecting film 22. The protecting film 22 can also be formed by adhering a thin film to the Si substrate 14, or by coating the Si substrate 14 with a resin, paint or the like.

The foregoing processes constitute a second step of filling the magnetic substances 21 into the grooves 19 formed in the above mentioned first step.

Figure 13:
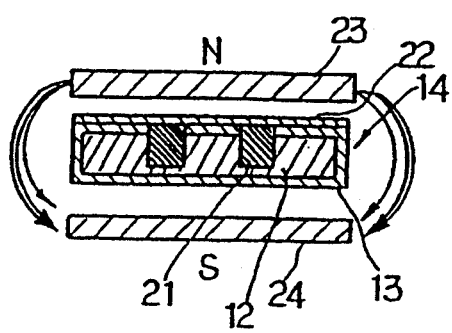
FIG. 13 is a vertical cross-sectional view of the oxidized silicon substrate during a magnetizing operation.

Then, as shown in FIG. 13, the magnetic substances 21 are magnetized by a magnetizing apparatus comprising a north pole plate 23 and a south pole plate 24. The north and south pole plates 23 and 24 are positioned so that the oxidized Si substrate 14 are interposed therebetween. The magnetic substances 21 are magnetized by the magnetic field having a direction perpendicular to the surface of the oxidized Si substrate 14.

This process constitutes a third step of magnetizing magnetic substances 21 filling the grooves 19 in the above mentioned second step.

Figure 14:
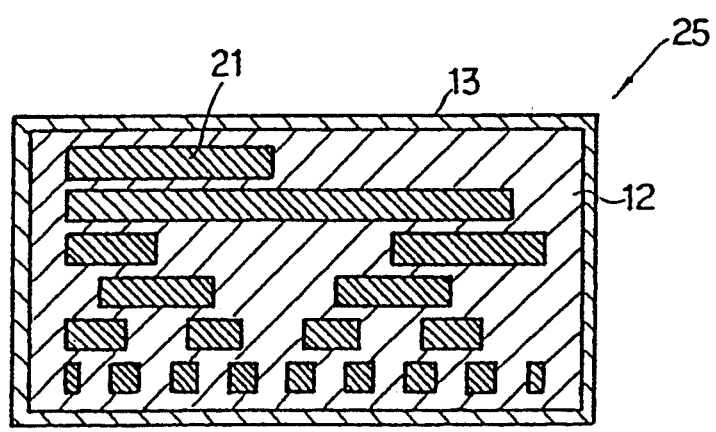
FIG. 14 is a horizontal cross-sectional view of the oxidized silicon substrate with magnetized substances arranged in accordance with predetermined patterns.

With the first, second and third steps described above, the oxidized Si substrate 14 having magnetized magnetic substances arranged according to the predetermined magnetic patterns is manufactured. That is, a magnetic scale 25 such as that shown in FIG. 14 is manufactured.

As has been described hereinbefore, the embodiment of FIGS. 1-14 comprises the steps of forming grooves respectively corresponding to the predetermined patterns in a substrate used for anisotropically etching, filling the magnetic substances into the grooves and magnetizing the magnetic substances. Accordingly, an extremely precise magnetic patterns can be easily manufactured, and furthermore, various sorts of extremely precise magnetic patterns can be easily provided by exchanging mask patterns. In addition, the magnetic substances can be magnetized at one time, thereby greatly shortening the time needed for magnetization. In addition, in each process, a large number of substrate materials can be treated, thereby shortening the time needed for manufacturing magnetic patterns. Furthermore, the magnetic patterns having a powerful magnetism can be obtained, so that a powerful intensity of a magnetic field can be generated at the time of detecting an electric signal, thereby increasing the S/N ratio of the signal. While it, has been described that the article is the magnetic scale 25, it is noted that it may also be applicable to a rotor of a rotary type motor with permanent magnet and to an armature or a stator of a linear type motor with permanent magnets. These motors are classified into a direct current motor and an alternating current motor and can be used as stepping motors, direct current brushless motors or the like. Furthermore, the article of the present invention is applicable to a generator. Although it has been described that the grooves 19 are etched by a wet etching process, it is noted that they may also be etched by a dry etching process such as a reactive-ion etching (RIE) process. In the case of the dry etching process, the substrate is not limited to a singlecrystal silicon.

Figure 15:
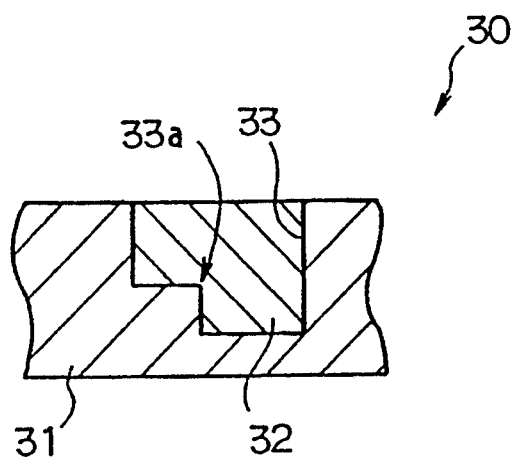
FIG. 15 is a fragmentary sectional view showing an embodiment of a magnetic medium according to the present invention.
Figure 16:
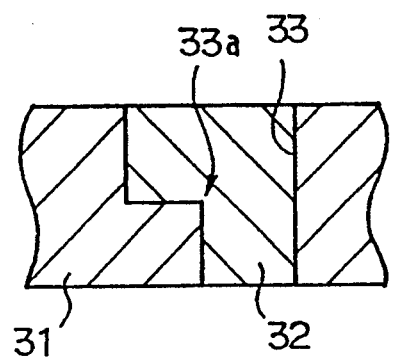
FIG. 16 is a view similar to FIG. 15 showing a modification of the magnetic medium of FIG. 15.
Figure 17:
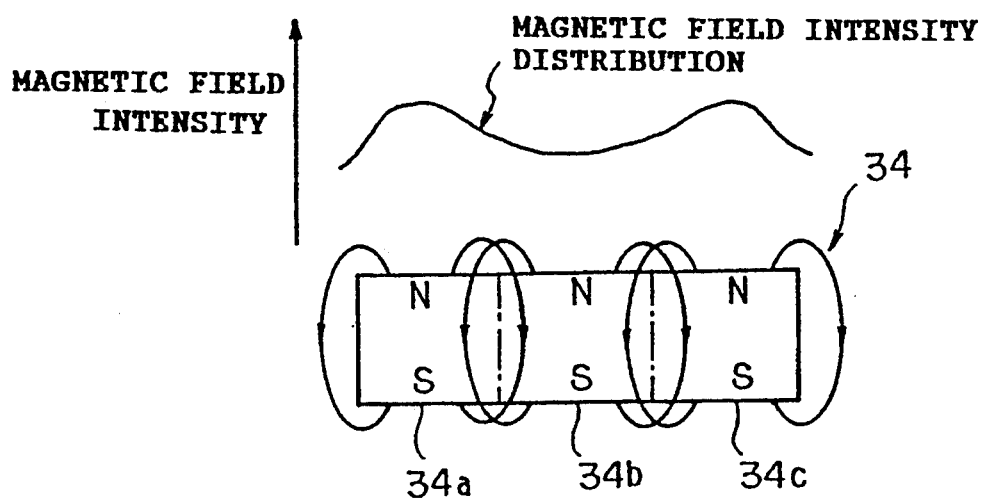
FIG. 17 is a diagram showing the magnetic field intensity of a magnetic substance having a uniform thickness.
Figure 18:
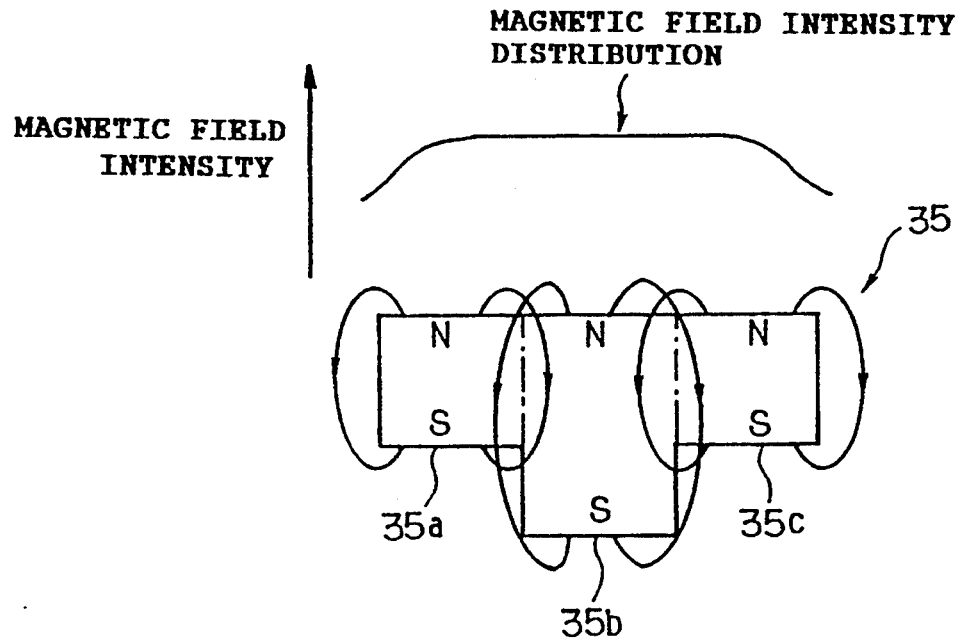
FIG. 18 is a diagram showing the magnetic field intensity of a magnetic substance having an ununiform thickness.

FIG. 15 illustrates an embodiment of a magnetic medium according to the present invention. Reference numeral 30 denotes a magnetic medium, which comprises a substrate 31 and a magnetic substance 32. The substrate 31 is made of singlecrystal (monocrystalline) Si or singlecrystal Si having impurities, such as nitrogen or boron, confused therein. The substrate 31 is formed with a stepped pit 33 in which the magnetic substance 32 is filled. The stepped pit 33 has a step portion 33a. Note that the stepped pit 33 may have a plurality of different step portions having different depths. The stepped pit 33 can also extends through the back portion of the substrate 31, as shown in FIG. 16. Since the stepped pit 33 has the step portion 33a, the magnetic substance 32 can be varied step by step in thickness. If the magnetic substance 32 formed with a stepped bit having a plurality of different step portions is magnetized by changing the number and position of the step portions, an arbitrary magnetic field intensity distribution can be obtained. As shown in FIG. 17, when a magnetized magnetic substance 34 is uniform in thickness and comprises three magnet portions 34a, 34b and 34c, the intermediate magnet portion 34b is subjected to a magnetization in the direction opposite to the direction of its magnetization from the magnet portions 34a and 34c. As a consequence, the intermediate magnet portion 34b becomes weak in magnetic force, and the magnetic field intensity distribution of the magnetic substance 34 becomes as shown in FIG. 17. When, on the other hand, a magnetic substance 35 varies in thickness and comprises three magnet portions 35a, 35b and 35c as shown in FIG. 18, the intermediate magnet portion 35b is likewise weakened as in the above case, but since the intermediate magnet portion 35b is greater in thickness than the magnet portions 35a and 35c, the magnetic field intensity distribution of the magnetic substance 35 becomes as shown in FIG. 18. The magnetic filed intensity distribution of FIG. 18 is uniform, as compared with that of FIG. 17. That is, the magnet portions of the magnetic substance 35 are selected so that the magnetic field intensity distribution becomes uniform. Therefore, an arbitrary magnetic filed intensity distribution can be obtained.

Figure 19:
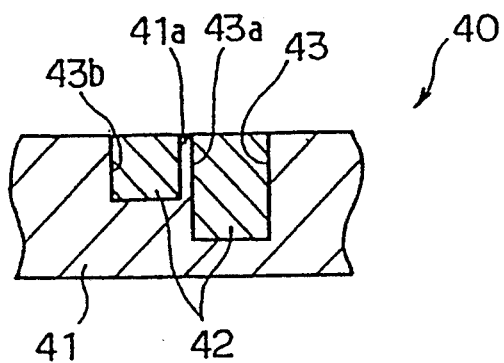
FIG. 19 is a fragmentary sectional view showing a second embodiment of the magnetic medium according to the present invention.

FIG. 19 illustrates a second embodiment of the magnetic medium according to the present invention. Reference numeral 40 denotes a magnetic medium, which comprises a substrate 41 and a plurality of magnetic substances 42. The substrate 41 is made of singlecrystal (monocrystalline) Si or singlecrystal Si having impurities, such as nitrogen or boron, confused therein. The substrate 41 is formed with a pit 43 in which the magnetic substances 42 are buried. The pit 43 comprises a first groove 43a and a second groove 43b adjacent to the first groove 43a through a boundary wall 41a. The depth of the first groove 43a is deeper than that of the second groove 43b. Note that the number of the grooves may be three or more and that the depth of the second groove 43b may be deeper than that of the first groove 43a. The pit 43 can also extends through the back portion of the substrate 41, as in the case of the embodiment of FIG. 16. Since the pit 43 is constituted by the two adjacent grooves 43a and 43b difference in depth, the magnetic substances 42 can be varied in thickness in proportion to the depths of the grooves 43a and 43b. If the magnetic substances 42 are magnetized by changing the number of the grooves and the depths of the grooves, an arbitrary magnetic filed intensity distribution can be obtained.

Figure 20:
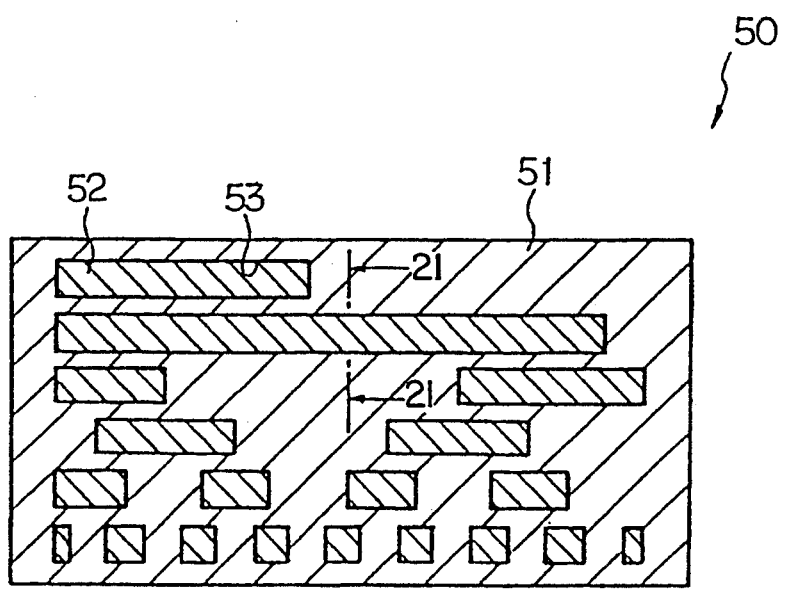
FIG. 20 is a horizontal sectional view showing a third embodiment of the magnetic medium according to the present invention.
Figure 21:
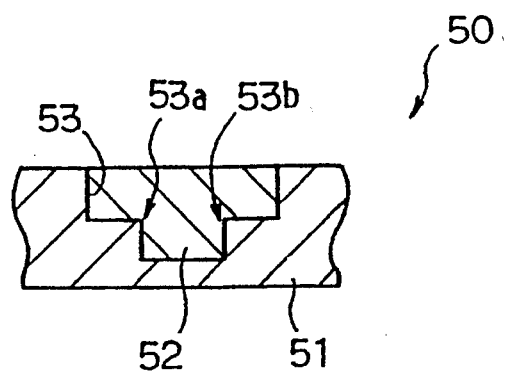
FIG. 21 is a fragmentary sectional view taken along the line K—K of FIG. 20.
Figure 22:
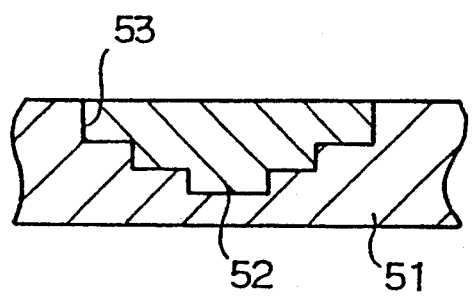
FIG. 22 is a fragmentary sectional view showing a modification of the magnetic medium of FIG. 21.

FIGS. 20 and 21 illustrate a third embodiment of the magnetic medium according to the present invention. Reference numeral 50 denotes a magnetic medium, which is used as magnetic patterns. The magnetic medium 50 comprises a substrate 51 and a plurality of magnetic substances 52. The substrate 51 is made of singlecrystal (monocrystalline) Si, etc. The substrate 51 is formed with a plurality of stepped pits 53 in which the magnetic substances 52 are buried. The stepped pit 53 is formed with two step portions 53a and 53b so that the depth of the stepped pit 53 becomes deeper toward the central portion of the stepped pit 53, as shown in FIG. 21. Note that the number of the step portions may be three or more. In addition, the stepped pit 53 may be in the form of the cross section of FIG. 22.

Figure 23:
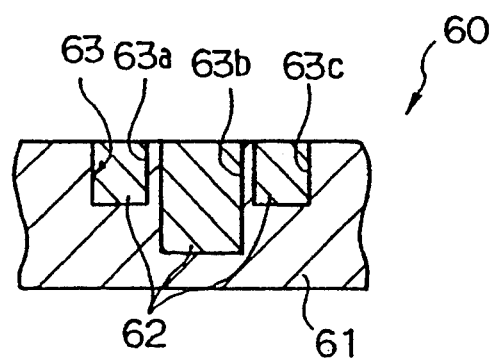
FIG. 23 is a fragmentary sectional view showing a Fourth embodiment of the magnetic medium according to the present invention.

FIG. 23 illustrates a fourth embodiment of the magnetic medium according to the present invention. Reference numeral 60 denotes a magnetic medium, which is used as the magnetic patterns of a magnetic scale. The magnetic medium 60 comprises a substrate 61 and a plurality of magnetic substances 62. The substrate 61 is made of singlecrystal (monocrystalline) Si, etc. The substrate 61 is formed with a pit 63 disposed according to predetermined patterns, and the magnetic substances 62 are filling the pit 63. The pit 63 is constituted by three grooves 63a, 63b and 63c which are adjacent to one another. The intermediate groove 63b is greater in depth than the grooves 63a and 63b. Note that the number of the grooves may be four or more. This embodiment of FIG. 23 can obtain the same effect as that of the embodiment of FIG. 19, because the FIG. 23 embodiment includes the FIG. 19 embodiment. In addition, if the magnetic substances 62 are magnetized, the magnetic field intensity distribution thereof can be made uniform, since the magnetic substances 62 are identical in construction with the magnetic substance 35 of FIG. 18. Furthermore, the magnetic field intensity becomes large in the vicinity of the central portion of the magnetic substances 62, the average of the magnetic field intensity can be increased. Therefore, if the magnetic substance 60 is used as magnetic patterns of a magnetic scale, the S/N ratio of a detection signal can be increased in detecting magnetism.

FIGS. 24 through 31 illustrate a method of manufacturing the magnetic medium 50 of FIG. 21 in accordance with one embodiment of the present invention. The parts of the embodiment of FIGS. 24-31 substantially identical to corresponding parts of the embodiment of FIGS. 1-14 are designated by like reference numerals and therefore a detailed description will not be given.

Figure 24:
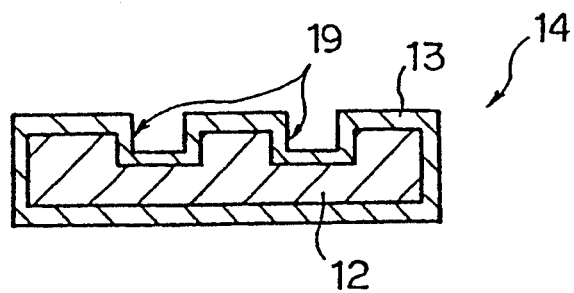
FIGS. 24 through 31 are diagrams showing a method of manufacturing a magnetic medium in accordance with the present invention.
Figure 25:
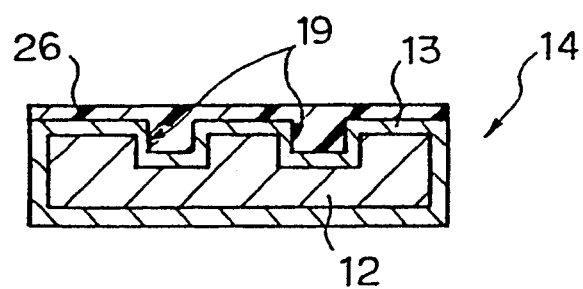

An oxidized Si substrate 14 with first grooves 19 (which are produced by the first photoetching process of FIGS. 1-9(a)) is oxidized within a furnace (not shown) heated to 1000° C., so that the entire surface of the Si substrate 14 is coated with a silicon dioxide (SiO$_2$) layer 13, as shown in FIG. 24. The upper surface of the Si substrate 14 is coated with a resist 26 by a spin coater (not shown), as shown FIG. 25. After the resist 26 has been stabilized, a glass plate (photomask) 27 having a predetermined mask pattern is placed on the resist 26.

Figure 26:
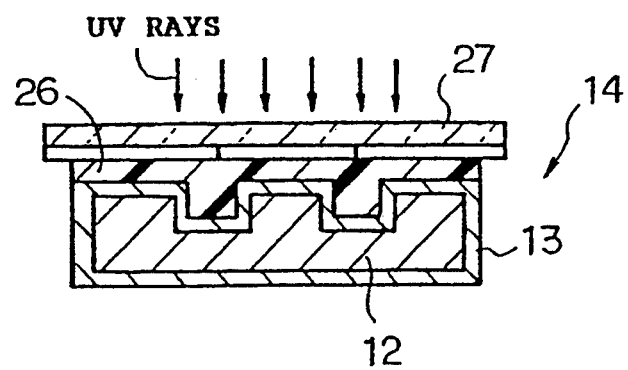
Figure 27:
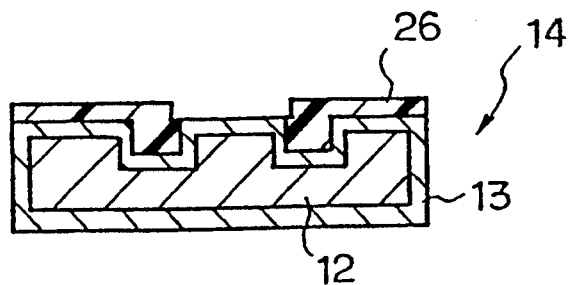
Figure 28:
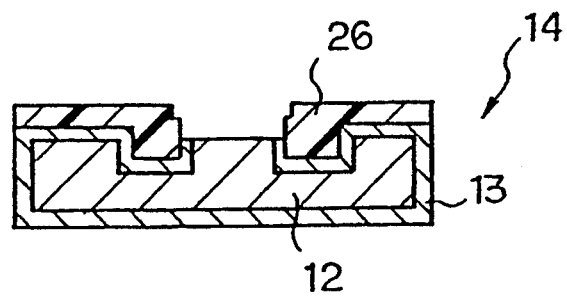
Figure 29:
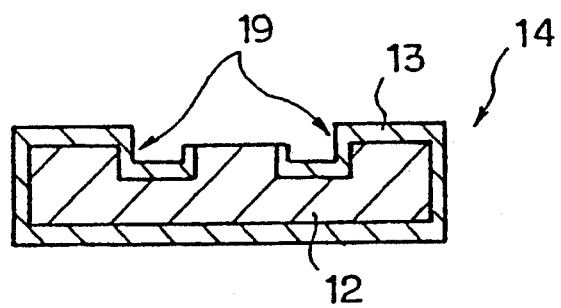
Figure 30:
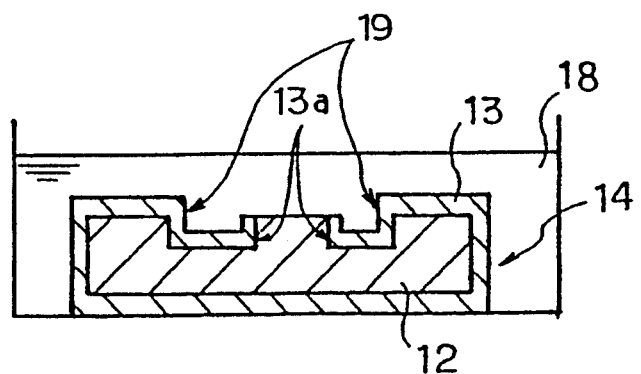
Figure 31:
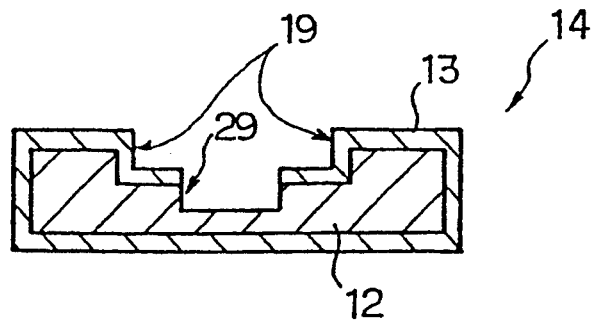
Figure 32:
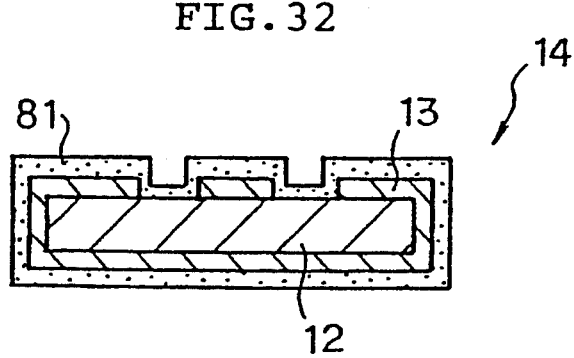
FIGS. 32 through 43 are diagrams showing another embodiment of the method of manufacturing a magnetic medium.

The resist 26 is then exposed to ultraviolet (UV) rays through the pattern of the photomask 27, as shown in FIG. 26. The oxidized Si substrate 14 and the resist 26 are immersed in a developer, so that the UV rays exposed portions of the photoresist 15 are dissolved and removed from the oxidized Si substrate 14, as shown in FIG. 27. The exposed portion of the SiO$_2$ layer 13 is etched by a reactive-ion etching (RIE) apparatus (not shown), as shown in FIG. 28. Then, O$_2$ gas is supplied to a vacuum chamber for generating a plasma, and the resist 26 is completely removed from the SiO$_2$/Si substrate 14, as shown in FIG. 29. As illustrated in FIG. 30, the SiO$_2$/Si substrate 14 is then immersed in a potassium hydroxide (KOH) aqueous solution 18 and reacted until the exposed portion of the Si base 12 is etched in a direction perpendicular to the surface of the SiO$_2$/Si substrate 14, so that a second groove 29 having a depth deeper than those of the first grooves 19 is formed as shown in FIG. 31. Note that the side walls 13a of the layer 13 in FIG. 30 is removed during etching.

The above mentioned etching processes shown in FIGS. 24–31 are defined as a second photoetching process for forming a second predetermined pattern (second groove 29) different in depth from the first grooves 19 formed by the first photoetching process of FIGS. 1–9(a). Note that, when the second groove 29 is formed, it is formed in the portion (central portion) between the grooves 19 and does not have side walls such as the side walls 13a of FIG. 30, as shown in FIG. 31.

FIGS. 32 through 43 illustrate a method of manufacturing the magnetic medium 50 of FIG. 21 in accordance with another embodiment of the present invention. The parts of the embodiment of FIGS. 32–43 substantially identical to corresponding parts of the embodiment of FIGS. 1–14 are designated by like reference numerals and therefore a detailed description will not be given.

Boron (B) is thermally diffused on a SiO$_2$/Si substrate 14 that has been formed by the same processes as those shown in FIGS. 1–7. The thermal diffusion can be classified into two kinds, vapor-phase thermal diffusion and solid-phase thermal diffusion. In this embodiment, the solid-phase thermal diffusion is used. Note that ion implantation is also known as a deposition method of impurities. As shown in FIG. 31, a boron trioxide (B$_2$O$_3$) layer 81 is deposited on the substrate 14 by the solid-phase thermal diffusion. For example, the SiO$_2$/Si substrate 14 is placed in a thermal diffusion furnace 100 such as that shown in FIG. 43, and impurity gas B$_2$H$_6$, O$_2$ and carrier gas N$_2$ are supplied to the thermal diffusion furnace 100 heated to 900° C. As a consequence, the boron trioxide (B$_2$O$_3$) layer 81 is deposited on the SiO$_2$/Si substrate 14. The overall reaction is

Figure 43:
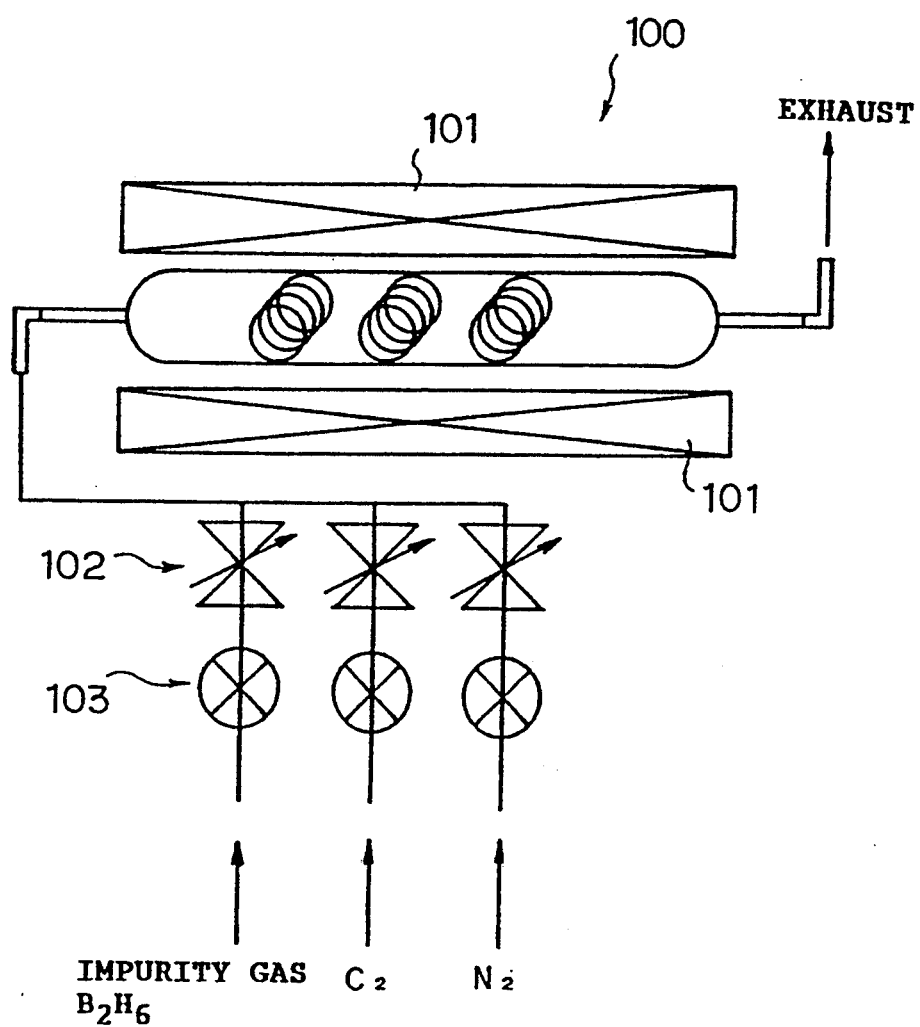

In FIG. 43, a heater is designated by 101, a flow-rate control valve by 102, and a stop valve by 103. By the reaction expressed by the above equation, the depositing process of the boron trioxide (B$_2$O$_3$) layer 81 is called predeposition diffusion. A small amount of B is diffused during predeposition diffusion, but it is distributed on the substrate surface with high concentration. The supply of the impurity gas B$_2$H$_6$ is stopped, and then the temperature of the furnace 100 is increased to 1100° C. in order to promote the reaction. This second reaction is

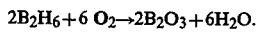

Figure 33:
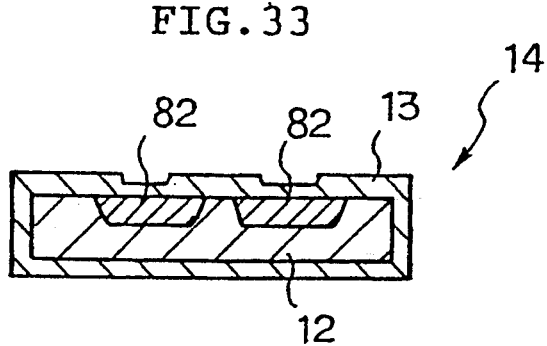

With the second reaction, B of B$_2$O$_3$ on the SiO$_2$/Si substrate 14 is diffused into the Si portion 12 (drive-in diffusion), SiO$_2$ is deposited on the SiO$_2$/Si substrate 14, and the exposed portion of the Si portion 12 is covered with the SiO$_2$ layer 13. FIG. 33 illustrates P layers 82 of p-type impurities after the drive-in diffusion. In this embodiment p-type impurities are used, but n-type impurities can also be used. The processes shown in FIGS. 32 and 33 correspond to a first process for implanting at least one of p- and n-type impurities of predetermined patterns in the SiO$_2$/Si substrate 14.

Figure 34:
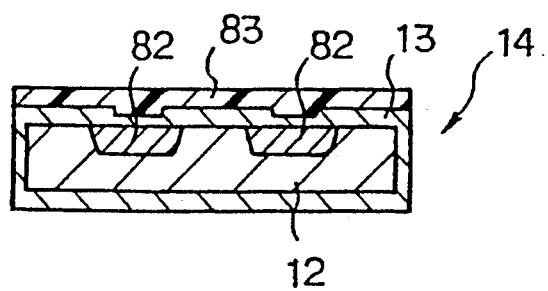
Figure 35:
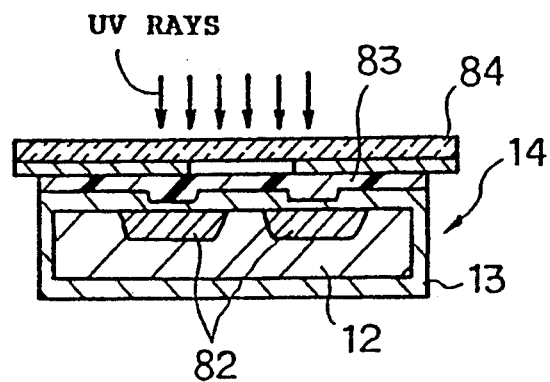
Figure 36:
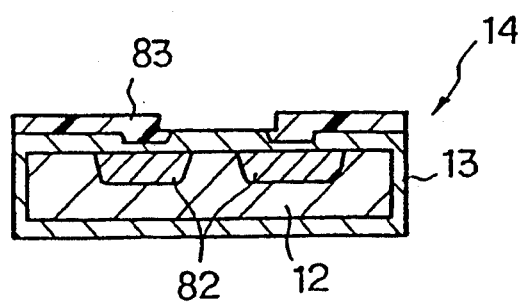
Figure 37:
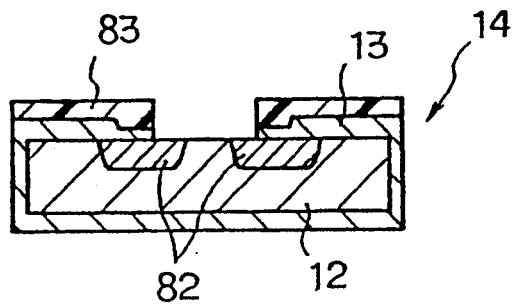
Figure 38:
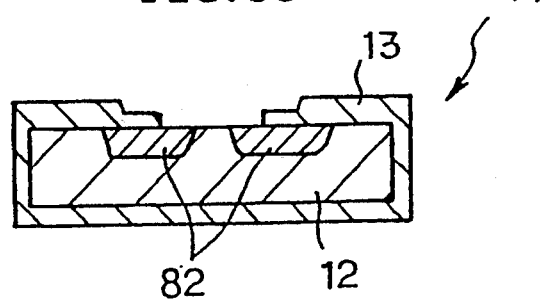
Figure 39:
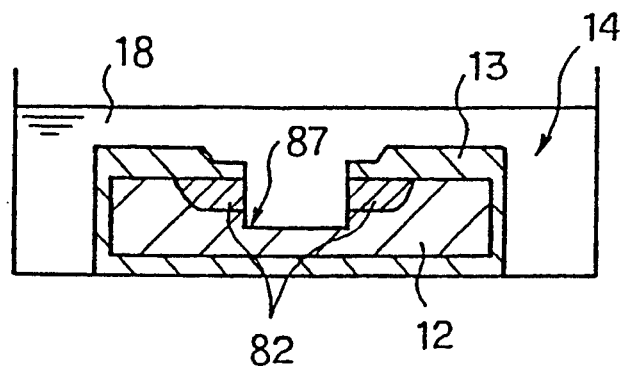
Figure 40:
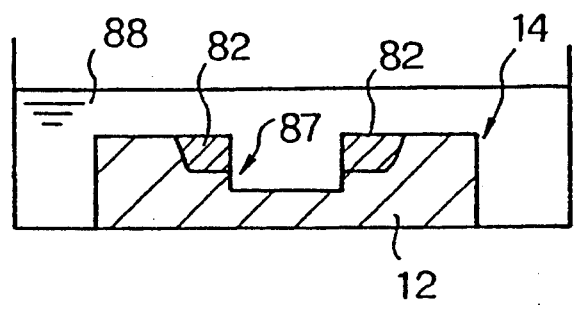
Figure 41:
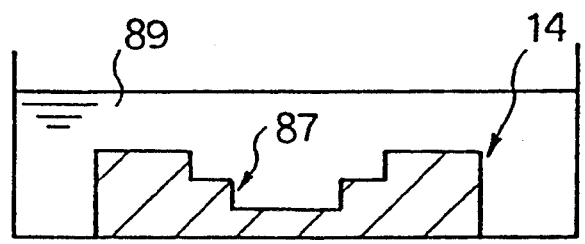
Figure 42:
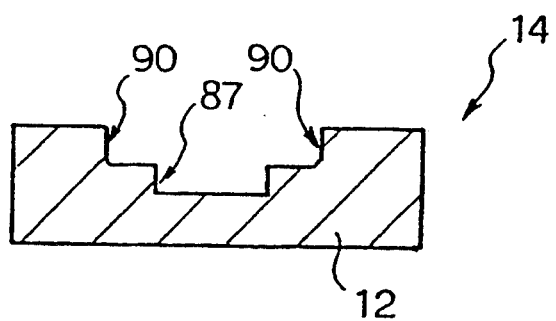

After the implantation process, the upper surface of the SiO$_2$/Si substrate 14 is coated with a resist 83 by a spin coater (not shown), as shown in FIG. 34. After the resist 83 has been stabilized at about 100° C., a glass plate (photomask) 84 having a predetermined mask pattern is placed on the resist 83. The resist 83 is then exposed to ultraviolet (UV) rays through the pattern of the photomask 84, as shown in FIG. 35. The pattern of the photomask 84 is formed so as to extend over the two P layers 82. The SiO$_2$/Si substrate 14 and the resist 83 are then immersed in a developer, so that the UV rays exposed portion of the resist 83 is dissolved and removed from the SiO$_2$/Si substrate 14, as shown in FIG. 36. The exposed portion of the SiO$_2$ layer 13 is etched by a reactive-ion etching (RIE) apparatus (not shown), as shown in FIG. 36. Then, O$_2$ gas is supplied to a vacuum chamber for generating a plasma, and the resist 83 is completely removed from the SiO$_2$/Si substrate 14, as shown in FIG. 38. As illustrated in FIG. 39, the oxidized Si substrate 14 is then immersed in the potassium hydroxide (KOH) aqueous solution 18 and reacted until the exposed portion of the Si base 12 and the exposed portions of the P layers 82 are etched in a direction perpendicular to the surface of the SiO$_2$/Si substrate 14, so that a first groove 87 is formed. Note that this etching does not undergo the influence of the doping distribution of the impurities. After formation of the first groove 87, the SiO$_2$ layer 13 is removed with fluoric acid, as shown in FIG. 40. Then, only the doped P layers 82 are etched with a mixed solution 89 of fluoric acid, nitric acid and acetic acid, as shown in FIG. 41. As a result, a second groove 90 is formed as shown in FIG. 42.

FIGS. 44 through 52 illustrate one embodiment of a method of manufacturing a magnetic pattern in accordance with the present invention.

Figure 44:
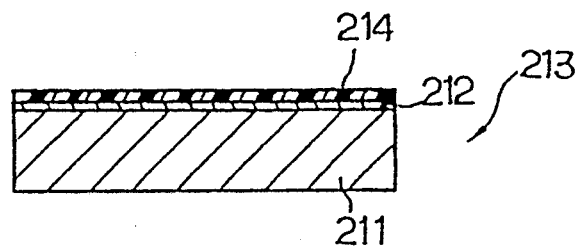
FIGS. 44 through 52 are diagrams showing one embodiment of a method of manufacturing a magnetic pattern in accordance with the present invention.

As illustrated in FIG. 44, the surface of a metal layer 212 on an Al(Aluminum)/Si(Silicon) substrate 213 is coated with a photoresist 214 by spin coating. Furthermore, the Al/Si substrate 213 coated with the photoresist 214 is putted into a constant temperature oven (not shown) heated to about 100° C. so that the photoresist 214 is stabilized.

Figure 45:
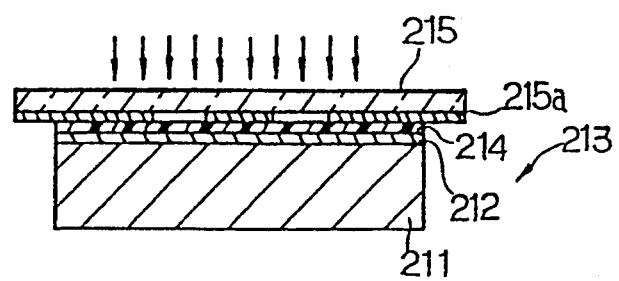

As shown in FIG. 45, a photomask 215 made from a glass plate having predetermined mask patterns is placed on the photoresist 214, and the photoresist 214 is then exposed to ultraviolet (UV) rays through the patterns of the photomask 215. In this embodiment, the photoresist 214 comprises a positive resist.

Figure 46:
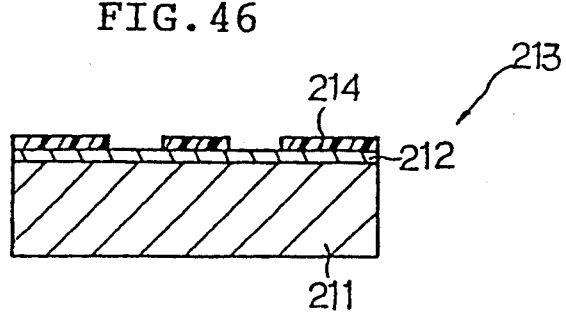

The Al/Si substrate 213 and the photoresist 214 are then immersed in a developer, so that the UV rays exposed portions of the photoresist 214 are dissolved and removed from the Al/Si substrate 213, as shown in FIG. 46. The patterns formed in the photoresist 214 are the same as those on the photomask 215.

Figure 47:
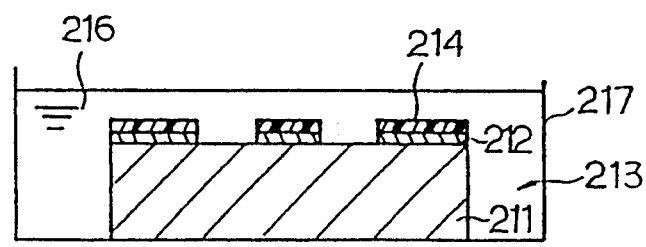
Figure 48:
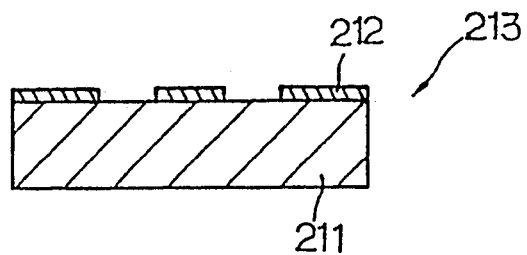

As illustrated in FIG. 47, the metal layer 212 is etched with an etching solution 216. At the time that the exposed portions of the metal layer 212 have been etched, the Al/Si substrate 213 is taken out from the beaker 217 and washed by pure water, then the etching solution 216 is completely removed from the Al/Si substrate 213. As a result, the mask patterns are transferred to the metal layer 212, and the surface of the Si substrate 211 is selectively exposed. The resist 214 is then removed as shown in FIG. 48.

Figure 49:
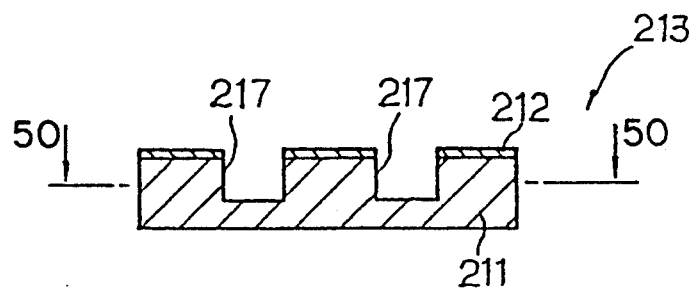
Figure 50:
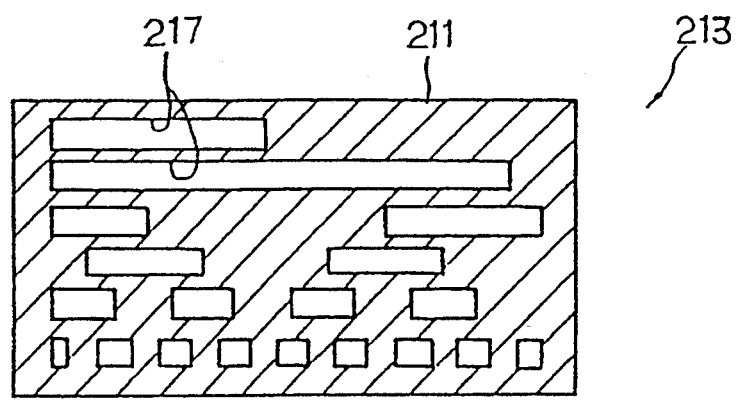
Figure 51:
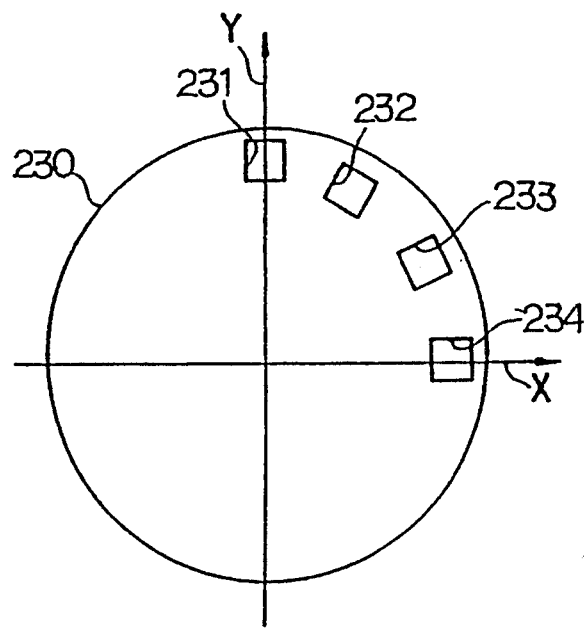

After the removal of the resist 214, the Al/Si substrate 213 is dry etched by a reactive-ion etching (RIE) apparatus (not shown). As a result, grooves 217 are formed in the Al/Si substrate 213, as shown in FIGS. 49 and 50. More specifically, in a vacuum chamber the Al/Si substrate 213 is caused to react with F element of $CF_4$ or $SF_6$. F element does not react with Al, so it functions as a mask. The depth of each groove 217 is about 100 $\mu$m. Note that, in the resist 214 removing process, the resist can also be removed with $O_2$ gas. In the case that the metal layer 212 is not removed and that a magnetic scale is fixed to a casing, the metal layer and the casing can be easily soldered. On the other hand, in the case that the metal layer 212 is removed, the problem of the separation between the metal layer and the Si substrate, which is caused due to a difference in the thermal expansion coefficients, can be eliminated. In wet chemical etching by acid or alkali, the etch rate depends upon the orientation of the crystal axis of monocrystalline crystalline Si. For example, when a silicon wafer having a flat surface as a (100)-plane is etched with a KOH aqueous solution, the etch rate for the <110>-orientation on the flat surface is one several-hundredths of the etch rate for the <111>-orientation vertical to the wafer. The etch rate for other orientations on the flat surface is several times the etch rate for <111>-orientation. When pits are formed in a Si wafer, it is preferable that the wafer surface is a (100)-plane and that the etch rate for the (100)-plane is higher than that for the <110> orientation vertical to the wafer surface. Although, as described above, the etch rates on the wafer surface are different depending upon directions on the wafer surface, there is no problem if an accuracy in the dimensions of a pit is not required or if the space between pits is sufficiently large. However, if, like a rotary magnetic encoder, pits are arranged on the circumference of a circle and the space between two adjacent pits is small, it is undesirable that the etch rates on the wafer surface are different depending upon directions on the wafer surface. Assume now that, as shown in FIG. 51, the surface of a Si wafer 230 is a (110)-plane and the X coordinate is a <111>-orientation and a plurality of pits 231-234 disposed on the circumferential direction of the wafer are formed in the Si wafer 230. If the Si wafer 230 is etched through a mask having patterns corresponding to the pits 231-234 by wet etching, the sides of the pits 231 and 234 parallel to the Y coordinate are etched and the shapes of the etched sides become equal to the shapes formed at the start of etching. However, since the etch rates for orientations different from the Y coordinate is higher than that for the <111>-orientation, the pit sides not parallel to the Y coordinate and also each side of the pits 232 and 233 do not become equal to the shapes formed at the start of etching. If in a rotary encoder the pits are not formed as shown in FIG. 51, the positional accuracy of the pits will be reduced since the space between the encoder pits is small.

When, on the other hand, pits are formed by dry etching such as RIE, the etch rate does not vary depending on the crystal axis direction of monocrystalline Si. In that case, independently of the axial direction, an etch rate becomes higher in the collision direction of an ion. An etch rate in the direction perpendicular to that collision direction is slower than the etch rate in the collision direction and has no relation with the crystal axial direction. Therefore, if dry etching is used, the pits 231-234 of FIG. 51 will become the same rectangular cross shapes as the mask patterns. In addition, even in a case where the space between pits is narrow, the positional accuracy of the pit can be prevented from being reduced.

Figure 52:
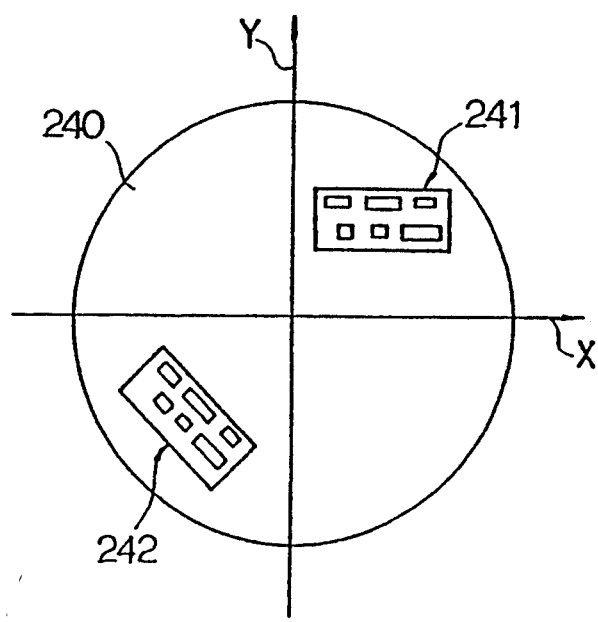

In addition, if dry etching is used when a linear-type magnetic pattern is produced from a Si wafer 240, a linear-type magnetic pattern of the same shape and dimensions can be fabricated even in the case of a magnetic pattern 241 or 242 as shown in FIG. 52. For example, dry etching is particularly suitable when the pit space of a linear-type magnetic pattern is narrowed. If, on the other hand, wet etching is used, one side of the rectangle of a linear-type magnetic pattern must be parallel to the <111>-orientation, like the magnetic pattern 241. In the case of wet etching, a cost of fabrication is increased and inferior goods tend to occur, since the <111>-orientation must be taken into consideration. While in the above embodiments a semiconductor wafer for integrated circuit (IC) fabrication has been used as a substrate, the present invention is not limited to the semiconductor wafer. For example, materials such as germanium, gallium, arsenic, glass and arsenic oxide, which can be dry etched by RIE and are not magnetized, can also be used. Furthermore, since dry etching is used in the second process, straight-walled grooves can be obtained even in the case that a magnetic pattern is disposed independently of the crystal direction of a substrate material. In addition, the range of materials that can be used as a substrate can be enlarged.

FIGS. 53 through 62 illustrate another embodiment of the method of manufacturing a magnetic pattern in accordance with the present invention.

Figure 53:
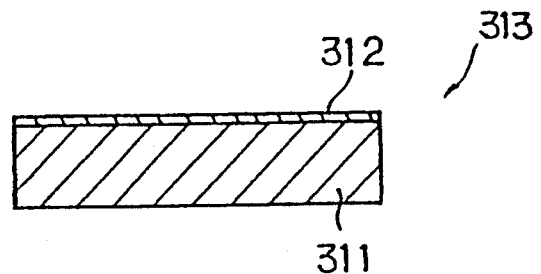
FIGS. 53 through 62 are diagrams showing another embodiment of the method of manufacturing a magnetic pattern.

As shown in FIG. 53, a metal film 312 is deposited on a Si substrate 311 by a thin film forming process, such as a chemical vapor deposition (CVD) process and a sputter deposition process. In this embodiment, the metal film 312 is made of chromium (Cr) and has a film thickness of about 1 $\mu$m.

Figure 54:
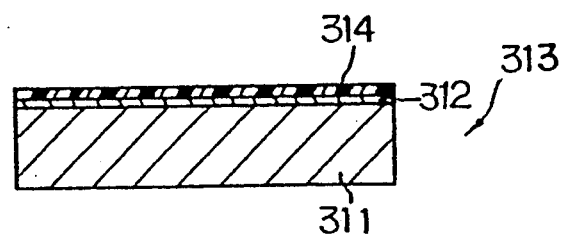

As illustrated in FIG. 54, the surface of a Cr/Si substrate 313 is coated with a resist 314 by spin coating. Since the resist compound is used as a mask for etching chromium, it is necessary that the resist compound is durable against an etching solution for chromium which is a mixed solution of potassium ferricyanide and caustic soda.

Figure 55:
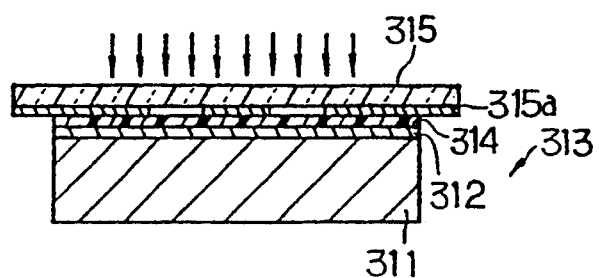

As shown in FIG. 55, a photomask 315 made from a glass plate having predetermined mask patterns is placed on the resist 314 of the Cr/Si substrate 313, and the resist 314 is then exposed to ultraviolet (UV) rays through the patterns of the photomask 315. The patterns of the photomask 315 are formed by a material 315a impermeable to UV rays. In this embodiment, the resist 314 comprises a negative resist.

Figure 56:
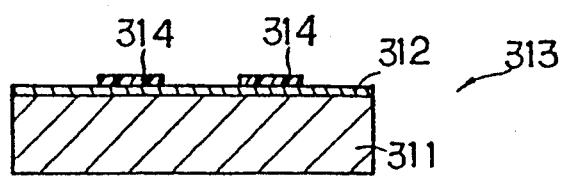

The Cr/Si substrate 313 and the resist 314 are then immersed in a developer, so that the unexposed portions of the resist 314 are dissolved and removed from the Cr/Si substrate 313, as shown in FIG. 56. The patterns formed by the exposed portions of the metal layer 312 are the same as those on the photomask 315. That is, the patterns of the photomask 315 is transferred onto the Cr/Si substrate 313.

Figure 57:
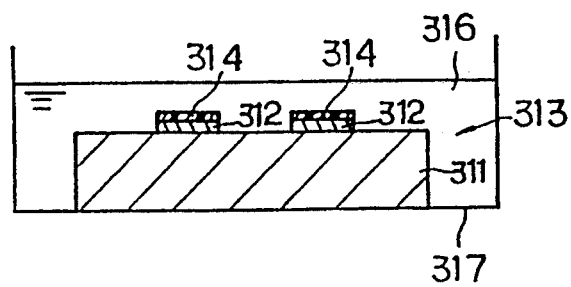
Figure 58:
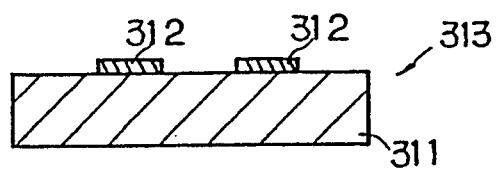
Figure 59:
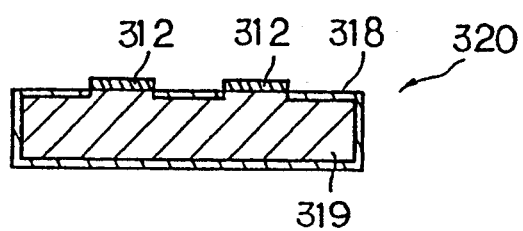

Cr, that is, metal layer 312 is etched with the above-described etching solution 316, as shown in FIG. 57. More particularly, the etching solution 316 (mixed solution of potassium ferricyanide and caustic soda in water) is supplied into a beaker 317 placed on a stirrer (not shown), and then a stirring element is brought into the beaker 317. At the time that the exposed portions of the metal layer 312 have been etched, the Cr/Si substrate 313 is taken out from the beaker 317 and washed by pure water, then the etching solution 316 is completely removed from the Cr/Si substrate 313. As a result, the mask patterns are transferred onto the metal layer 312, and the surface of the Si substrate 311 is selectively exposed. The resist 314 is then removed as shown in FIG. 58. The Cr/Si substrate 313 is oxidized within a furnace (not shown) heated to 1000° C. As a result, a $SiO_2$ film 318 is formed on the exposed portions of the Si substrate 311, as shown in FIG. 59. Assume now that the portion of the Si substrate which has not been oxidized is a Si portion 319 and that a substrate comprising the Si portion 319 and the $SiO_2$ film 318 is a $SiO_2/Si$ substrate 320. In the oxidization process, a $SiO_2$ film is not formed on the portion of the Si substrate covered with the metal film 312.

Figure 60:
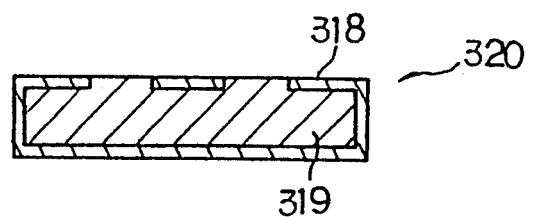
Figure 61:
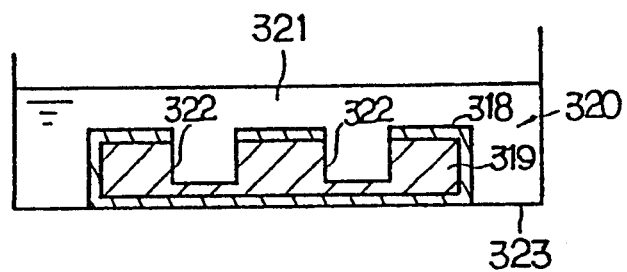
Figure 62:
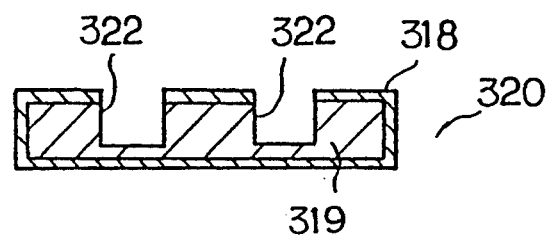
Figure 63:
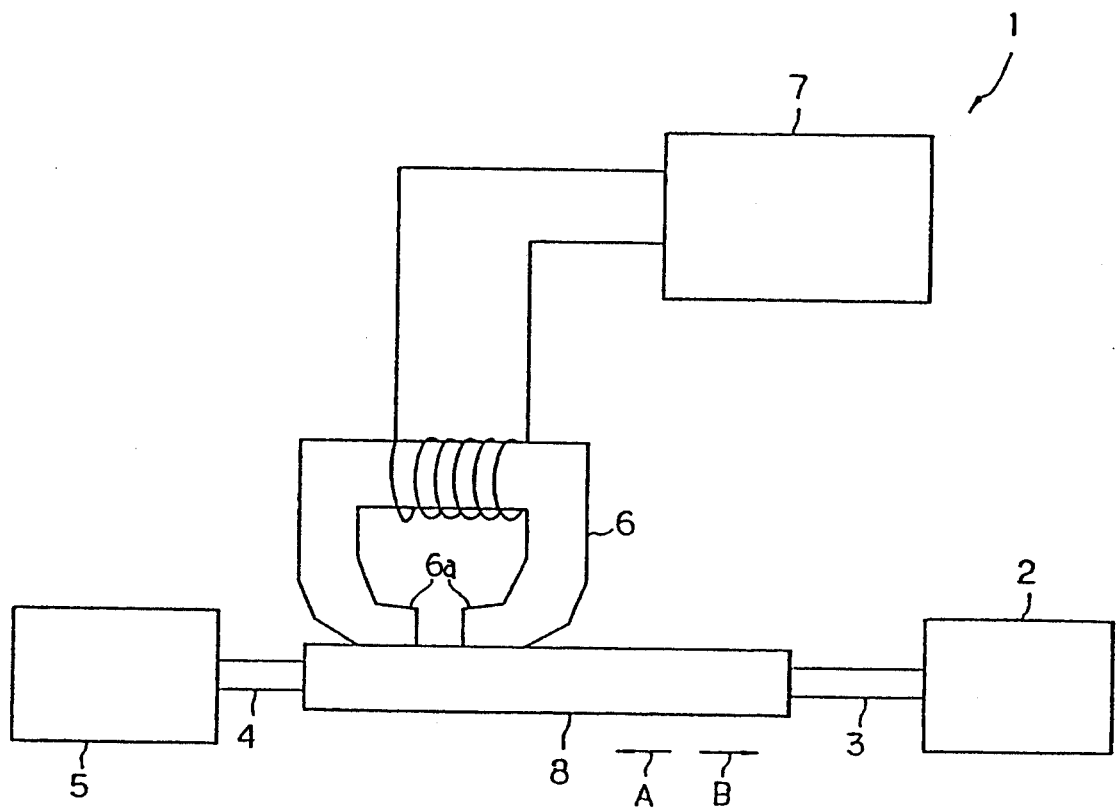
FIG. 63 is a schematic view of a prior-art magnetic pattern manufacturing apparatus.

The $SiO_2/Si$ substrate 320 is immersed in the abovedescribed etching solution for Cr, and the remaining metal film 312 is then removed as shown in FIG. 60. As illustrated in FIG. 61, the $SiO_2/Si$ substrate 320 is then immersed in a potassium hydroxide (KOH) aqueous solution 321 and reacted until the Si portion 319 is etched in a direction perpendicular to the surface of the $SiO_2/Si$ substrate 320, so that grooves 322 having vertical side walls are formed as shown in FIG. 62. As one condition of a material of the metal film 312, it is necessary that the material is not deformed at a temperature (900° to 1100° C. ) in the process of Si oxidization. Ti, Ni, Au—Cr alloy and Ni—Cr alloy can also be used as the metal film 312. In the case of Ti, a solution of $SHNO_3+HF$ is used as an etching solution. In the case of Ni, a solution of $HCl+HNO_3$ is used, and in the case of Au, a potassium iodide solution is used. In the embodiment of FIGS. 53–62, the etching used in the first and second processes is a wet chemical etching. Therefore, the embodiment does not require an expensive apparatus for dry etching such as RIE, and a cost of fabrication can be reduced.

What we claim is:

1. A magnetic medium comprising:
   a substrate formed with a pit; and
   a hard magnetic substance filling said pit, said hard magnetic substance being divided into at least two sections by an imaginary plane at right angles to the surface of said substrate, said sections being different in thickness from each other, each of said sections having a constant thickness over the area of such section, and said hard magnetic substance being magnetized.

2. A magnetic medium as recited in claim 1, wherein said substrate comprises a silicon or silicon-containing substrate.

3. A magnetic medium comprising:
   a substrate formed with a pit, the pit being divided into a plurality of grooves with partition portions of said substrate, and at least one of the grooves being different in depth from the remaining grooves; and
   hard magnetic substance filling in said grooves of said pit, each of said partition portions being smaller in width than each of the adjoining buried hard magnetic substances having such partition portion positioned therebetween, at least one of said hard magnetic substances being different in thickness from the remaining hard magnetic substances, each of said hard magnetic substances having a constant thickness over the area of such hard magnetic substance and said hard magnetic substances being magnetized.

4. A magnetic medium as recited in claim 3, wherein said substrate comprises a silicon or silicon-containing substrate.

5. A magnetic medium comprising:
   a substrate with a plurality of pits disposed according to predetermined patterns, the depth of the pit being increased gradually toward the central portion of the pit; and
   hard magnetic substance filling said pits, each of said hard magnetic substances having at least three sections which are different in thickness from each other, the thickness of the hard magnetic substance being increased gradually toward the central section of the hard magnetic substance, each of said at least three sections of the hard magnetic substance having a constant thickness over the area of such section, and said hard magnetic substances being magnetized.

6. A magnetic medium as recited in claim 5, wherein said substrate comprises a silicon or silicon-containing substrate.

7. A magnetic medium comprising:
   a substrate with a pit disposed according to predetermined patterns, said pit comprising at least three grooves adjacent to one another, the depths of said at least three grooves being increased gradually toward a center groove of said at least three grooves; and
   hard magnetic substances filling said at least three grooves of said pit, the thicknesses of the hard magnetic substances being increased gradually toward a center substance of said hard magnetic substances, and said hard magnetic substances having been magnetized.

8. A magnetic medium as recited in claim 7, wherein said substrate comprises a silicon or silicon-containing substrate.

* * * * *